Sept. 11, 1951      H. J. A. RUNSDORF      2,567,680
JACK KIT
Filed July 21, 1948      2 Sheets-Sheet 1
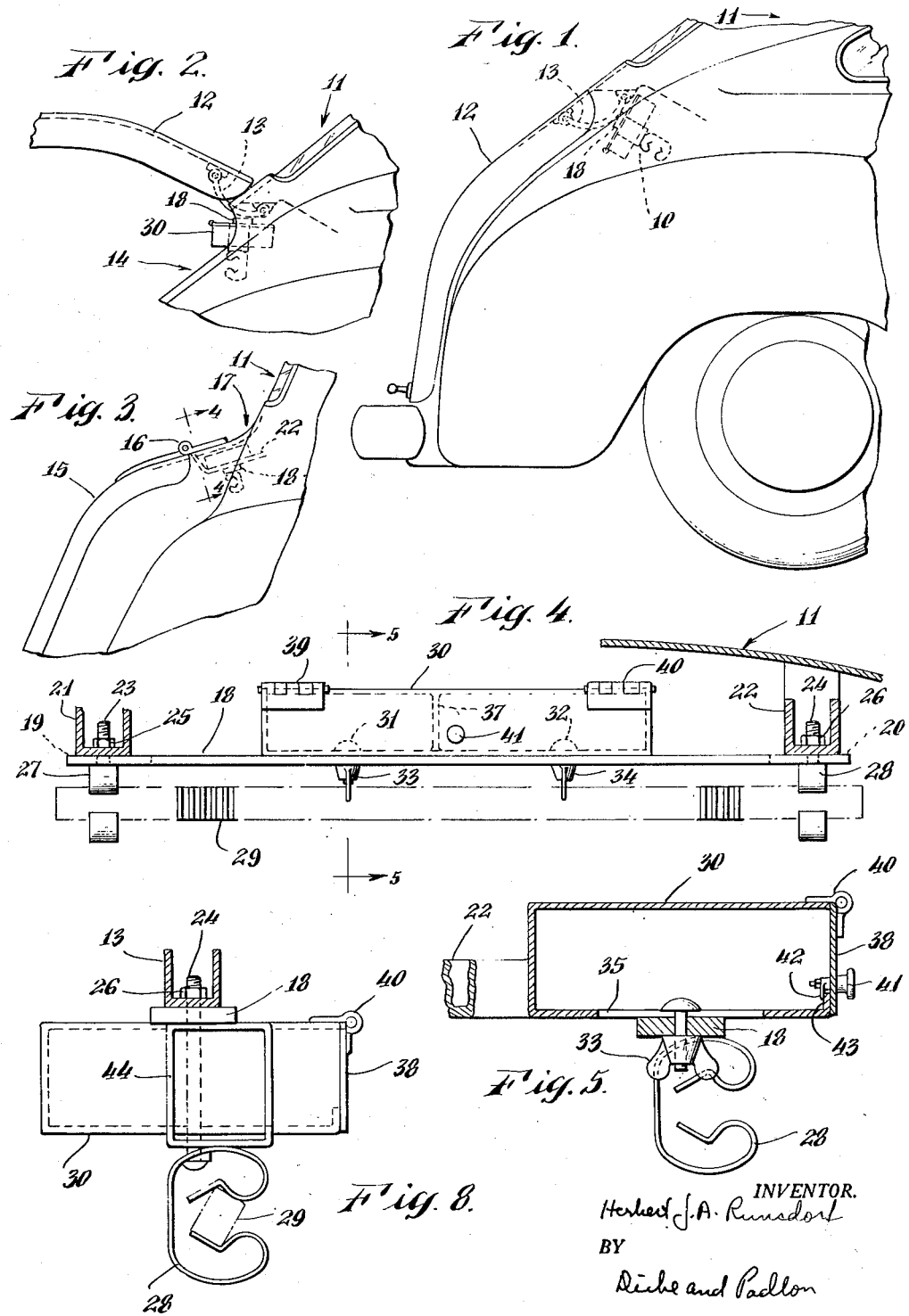

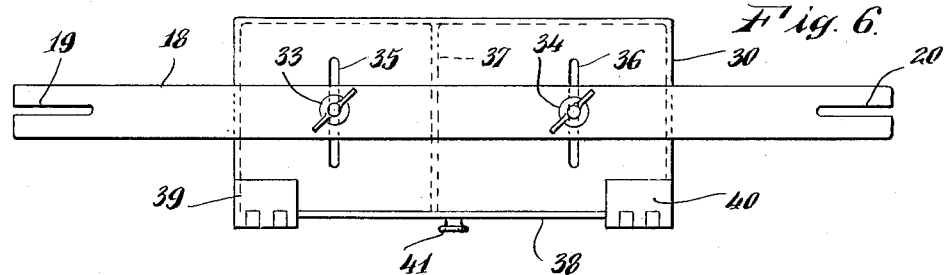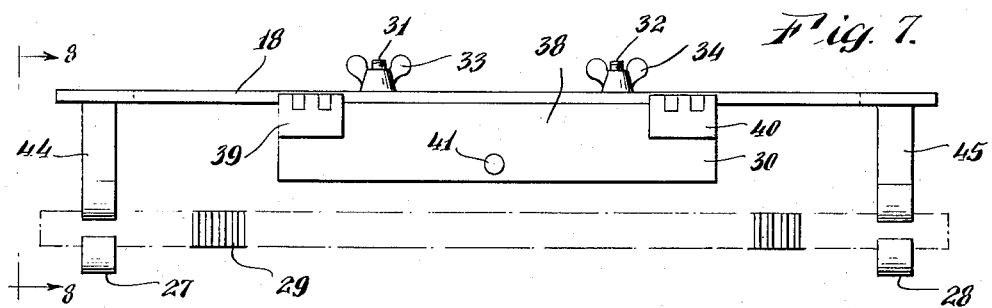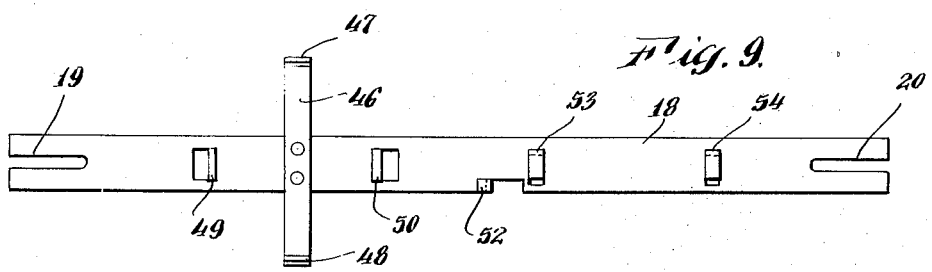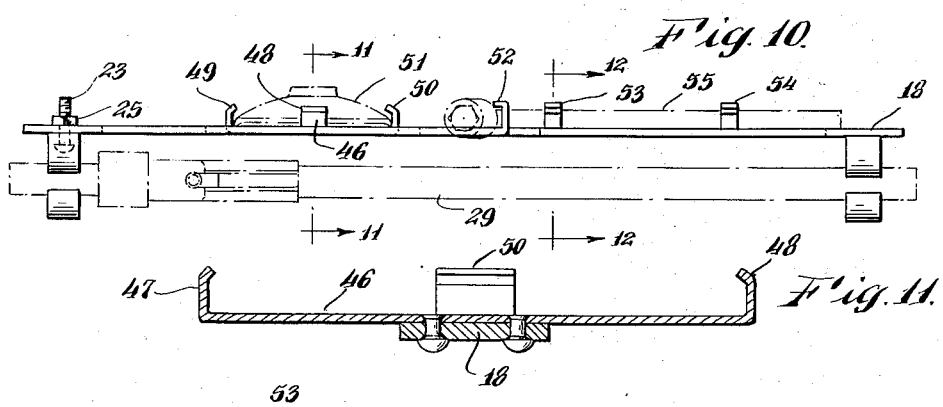

Patented Sept. 11, 1951

2,567,680

UNITED STATES PATENT OFFICE 2,567,680

JACK KIT

Herbert J. A. Runsdorf, Brooklyn, N. Y.

Application July 21, 1948, Serial No. 39,973

4 Claims. (Cl. 224—42.42)

This invention relates to a jack kit and more particularly to an automobile jack kit for retaining in rigidly fixed position the jack and its appurtenant parts normally carried as part of the accessories of automobiles as presently manufactured.

Heretofore, jack kits of various styles and sizes have been made and merely thrown into the trunk section of an automobile. The disadvantage of placing such jacks and their accessories in the trunk section of an automobile is that when said vehicle rapidly passes over a bump in the road or hits a depression on the road of travel, everything not fastened down in the trunk section jounces around. In view of the fact that at the present time the trend in manufacturing automobiles has been to provide standard types of jacks that are considered part of the automobile, it is desirable to utilize a device or kit adapted to retain such jack and accessory parts in a rigidly fastened condition inside the trunk section of the car and thereby eliminate the jouncing of such parts in the trunk of the car.

With the above and other disadvantages in view, it is an object of the present invention to provide a compact, easily assembled kit for an automobile jack and appurtenant tools for use in an automobile or car of standard type.

It is another object of the present invention to provide an easily attachable, economically made device for retaining an automobile jack and its appurtenant parts in a rigidly fixed and easily accessible position in the trunk section of said automobile so as to avoid jouncing of said articles.

Other and more specific objects of the present invention are to provide an easily assembled device for use in the upper part of the trunk section of a car for rigidly holding the standard form of jack and appurtenant articles in an automobile trunk, to avoid rummaging in the trunk section of the car when they are needed and to prevent jouncing of the parts when the car passes over bumps or ruts along the road or highway.

Other objects and features of the above invention will become apparent from the following description taken in conjunction with the accompanying drawings, in which Fig. 1 is a side view of the rear portion of an automotive vehicle showing the position of the preferred embodiment of the invention as mounted in the trunk section of the vehicle with the door of said trunk in closed position;

Fig. 2 is a sectional, fragmental detail of Fig. 1 showing the door of the trunk section of the vehicle in open position;

Fig. 3 is a fragmental, sectional detail of the embodiment used in a trunk of a construction different from that shown in Figs. 1 and 2;

Fig. 4 is a section taken on line 4—4 of Fig. 3;

Fig. 5 is a detail taken on line 5—5 of Fig. 4;

Fig. 6 is a plan view of a modification of the embodiment shown in Figs. 1 to 5;

Fig. 7 is a front view of Fig. 6;

Fig. 8 is an end view of Fig. 7;

Fig. 9 is a plan view of another modification of the embodiment shown in Figs. 1 to 5, inclusive;

Fig. 10 is a side view of Fig. 9 showing the jack, its base and lug wrench as mounted on this form of the invention;

Fig. 11 is a detail taken on line 11—11 of Fig. 10; and

Fig. 12 is a detail taken on line 12—12 of Fig. 10.

Referring now to the drawings showing preferred embodiments of the invention, and in which like reference characters denote like parts throughout, I provide a device 10 which is suitable for the standard types of automobile or car 11 presently being manufactured and as shown. It will be noted that for purposes of illustration, I show two types of automobile or car, each containing different trunk doors of different construction. In Figs. 1 and 2, it will be noted that the trunk door 12 is connected to the rear body portion of the car 11 by means of slidable hinges 13 which are attached to the interior of the door 12 and of the trunk 14, whereas the door 15 shown in sectional view of an automobile or car 11 in Fig. 3 is provided with externally mounted hinges 16 between the top portion of the door and the rear portion 17 of car 11. According to my invention, there is provided a cross bar member 18 containing a plurality of openings 19 and 20, each disposed at the respective end of said cross member. Said cross member 18 is fastened to channel iron members 21 and 22 disposed in the upper rear portion of the trunk of said car by means of a plurality of bolts 23 and 24 fitting through the respective openings 19 and 20 of the cross member 18 and through said channel iron members, but members 25 and 26 retain respective bolts 23 and 24 in position. Said bolts 23 and 24 are each provided with detents 27 and 28, respectively, held in position with respect to the cross member by means of said bolt and nut members, as shown in Fig. 4. Said detents are of any suitable size and of sufficient tension to retain a jack 29 in a position substantially parallel with and below the cross member 18.

Disposed intermediate said bolts or fastening members 23 and 24 and fixed to the top of said cross member 18, there is provided a small case or container 30 held in slidably fixed position by means of bolt members 31 and 32 and winged nuts 33 and 34, respectively. It is to be noted that said case or container 30 is provided, as shown in Fig. 6, with a pair of slots 35 and 36 disposed in the same plane and parallel to each other to permit lateral adjustment of said case 30 with respect to cross member 18. Said case 30, furthermore, is provided with a vertically extending partition 37, as shown in Fig. 4, so as to divide said case into two compartments, as shown. The front of said case has a door 38 which is hinged to the top of the case by means of hinge members 39 and 40 fixed to the outside of the top of the case. It is to be noted that said front door 38 is provided with a turn knob 41 extending into the interior of one of the compartments of the case and having a downwardly extending finger 42 adapted to form frictional contact with the upwardly extending wall section 43 of the case.

It will be noted that in the embodiment shown in Figs. 1 and 2 said case 30 is disposed beneath cross member 18, whereas in the embodiment shown in Figs. 3 and 4 case 30 is disposed above said cross member 18. Each of the compartments of the case as illustrated and described is adapted to contain the lug wrench and base of the jack and any of the incidental accessories normally carried in the trunk section of a car. In the modification shown in Figs. 6 and 7 case 30 is mounted below the member 18, in which case there are provided a plurality of extension members 44 and 45 adapted to accommodate bolts 23 and 24 and also detents 27 and 28, respectively.

In the modification shown in Figs. 9 to 12, inclusive, cross member 18 is mounted to the interior of the trunk in the manner shown with respect to Figs. 1, 2 and 3 in any suitable manner. Said member is provided with a short cross member 46 disposed at right angles to the cross member 18 having detents 47 and 48, as shown in Figs. 9, 10, and 11. These detents, with detents 49 and 50, are equispaced at right angles to each other in the same plane and are adapted to retain base plate member 51 of jack 29 in relatively fixed position. Said long cross member 18 is provided with other detents 52, 53, and 54 which can readily accommodate lug wrench member 55, as shown in Fig. 10, and which can be easily pulled out of fixed position, in which case the detents yield to the pulling effect exerted upon said wrench. The detents 53 and 54 are in alignment and in spaced relation, while detent 52 spaced from said other detents is at right angles thereto so as to permit hooking of the shorter arm of lug wrench 55, as shown in Fig. 10. It will be noted that said detents 49, 50, 52, 53, and 54, a detail of which is shown in Fig. 12, are punched directly from the cross member 18 and are so made as to yield to pressure or to a pull when inserting the base plate and lug wrench or when removing the same, as the case may be. Disposed beneath said cross member, as shown in Fig. 10, detent members 27 and 28 adjacent the ends of the cross member are adapted to retain jack 29 in relatively fixed position.

From the foregoing description taken in connection with the accompanying drawings, it will be noted that by my invention I have provided a device of any suitable size which can be easily assembled and fixed to any of the presently constructed types of automobile for carrying jack and accessory units in the trunk section of a car without requiring any modification or alteration in the construction of such car. Furthermore, the embodiment of my invention is easy to manufacture and is relatively inexpensive. It also is adapted to permit accessibility of the jack and its accessories, without requiring rummaging through the trunk. It permits quietness of driving in that the jack and wrench and plate are rigidly fixed on the cross member, which may be of any suitable size. Furthermore, this device can be easily made by punch press operations from steel plate and then easily packed for future use.

While preferred embodiments of the invention have been described, it is to be noted that various modifications, arrangements of parts, and use of material may be made without departing from the spirit and scope of the invention.

I claim:

1. A device for holding an automobile jack and accessory tools adapted to be attached to the top interior of the trunk section of an automobile, comprising a cross bar member having slitted open ends adapted to be fixed to the top of said trunk section, locking means at each end of the cross member connecting the cross member to the inner section of the trunk, a detent member depending from each of said means for retaining the jack below the cross member and parallel therewith, means on the cross member for retaining the accessory tools of the jack.

2. The combination with an automobile trunk, of a cross member fixed to and depending from the interior of the trunk, detent means disposed at terminal areas of the cross member for retaining a jack in a plane parallel with the cross member, and tensioned yieldable means carried by the cross member for retaining a base for the jack and a lug wrench for the jack.

3. A device for use in automobiles and the like for holding a jack and appurtenant tools in readily accessible position, comprising a removable cross-bar member having longitudinal open end slits on each end thereof, for mounting in the interior of the trunk compartment of the automobile a plurality of bolt detent means each having a bolt portion extending through each of the slits adapted to retain the bar in fixed position to one of the walls of the trunk and having the detent portion extending from said bar, said detent portions being adapted to hold the jack relatively parallel of the cross-bar, and a multipartitioned tool chest adjustably connected to the cross-bar intermediate the bolt detents and on the side of the bar member away from the jack.

4. A device for use in automobiles and the like for holding a jack and appurtenant tools in readily accessible position, comprising a removable cross-bar member having longitudinal open end slits on each end thereof, for mounting in the interior of the trunk compartment of the automobile a plurality of bolt detent means each having a bolt portion extending through each of the slits adapted to retain the bar in fixed position to one of the walls of the trunk and having the detent portion extending from said bar, said detent portions being adapted to hold the jack relatively parallel of the cross-bar, a multipartitioned tool chest adjustably connected to the cross-bar intermediate the bolt detents and on the side of the bar member away from the jack, said chest having a pair of spaced cross slots in the floor thereof, and a plurality of fastening means extending through the chest and bar member adapted to rigidly fix the chest to the cross-bar member.

HERBERT J. A. RUNSDORF.

REFERENCES CITED

The following references are of record in the file of this patent:

UNITED STATES PATENTS

| Number | Name | Date |
|---|---|---|
| 1,434,350 | Collins | Oct. 31, 1922 |
| 1,611,397 | Wells | Dec. 21, 1926 |
| 1,643,421 | Rowan | Sept. 27, 1927 |
| 1,762,321 | Auberlin | June 10, 1930 |
| 2,073,171 | Pittroff | Mar. 9, 1937 |
| 2,319,423 | Maihack | May 18, 1943 |
| 2,434,387 | Brandt | Jan. 13, 1948 |

FOREIGN PATENTS

| Number | Country | Date |
|---|---|---|
| 273,878 | Great Britain | July 14, 1927 |
| 448,567 | Great Britain | June 11, 1936 |
| 476,553 | Great Britain | Dec. 10, 1937 |
| 808,918 | France | Nov. 24, 1936 |